United States Patent
Restaino et al.

(10) Patent No.: US 7,869,058 B2
(45) Date of Patent: Jan. 11, 2011

(54) APPARATUSES AND METHODS FOR EVALUATING PERFORMANCE OF OPTICAL SYSTEMS

(76) Inventors: Sergio R. Restaino, 3705 Embudilo Dr., NE., Albuquerque, NM (US) 87111; Scott W. Teare, 45 Polvadera Rd., Polvadera, NM (US) 87828

( * ) Notice: Subject to any disclaimer, the term of this patent is extended or adjusted under 35 U.S.C. 154(b) by 51 days.

(21) Appl. No.: 11/560,661

(22) Filed: Nov. 16, 2006

(65) Prior Publication Data

US 2008/0212105 A1 Sep. 4, 2008

(51) Int. Cl.
*G01B 11/02* (2006.01)

(52) U.S. Cl. .................................... 356/515

(58) Field of Classification Search ............ 356/515, 356/521, 499, 508; 250/237 G
See application file for complete search history.

(56) References Cited

U.S. PATENT DOCUMENTS

| | | | | |
|---|---|---|---|---|
| 4,624,569 A * | 11/1986 | Kwon | ................ | 356/521 |
| 5,653,034 A * | 8/1997 | Bindon | ................ | 42/131 |
| 7,095,510 B2 * | 8/2006 | Fukui | ................ | 356/521 |
| 2005/0046863 A1 * | 3/2005 | Millerd et al. | ................ | 356/495 |
| 2006/0215177 A1 * | 9/2006 | Doerband | ................ | 356/609 |
| 2006/0274321 A1 * | 12/2006 | Cottrell | ................ | 356/495 |

OTHER PUBLICATIONS

Melles Griot vol. X The Practical Application of Light, 2005.*

* cited by examiner

*Primary Examiner*—Tarifur Chowdhury
*Assistant Examiner*—Jonathon D Cook
(74) *Attorney, Agent, or Firm*—Amy Ressing; John L Young (57) ABSTRACT

A system for evaluation of optical quality of an optical device includes a light source configured to generate light, the generated light be received by an optical device. An interferometric lens apparatus is removably mounted to the optical device to generate interference fringes. A camera device is configured to receive and display the interference fringes, and a computer configured to analyze the interference fringes received from the camera device to determine aberrations of the optical device and generate a recommendation to correct the determined aberrations. Methods for evaluating the optical quality of an optical device are also described.

15 Claims, 6 Drawing Sheets

APPARATUSES AND METHODS FOR EVALUATING PERFORMANCE OF OPTICAL SYSTEMS

TECHNICAL FIELD

Aspects of the invention generally relate to systems and methods for evaluation of optical quality of an optical device using a point diffraction interferometer.

BACKGROUND OF THE INVENTION

Rapid characterization of telescopes and other optical instruments is essential for field deployable and fixed mounted instrumentation. Changes in the optical alignment of such systems from thermal changes, vibration and placement errors should be corrected before they can be used.

Interferometers are typically used to evaluate optical systems and rely oil interfering light from two sources—light from one source acts as a reference while light from another source carries information from optical components being tested. Such a technique provides a sensitive measure of the deviation from the reference wavefront.

An optical device (e.g., a telescope) includes two or more main elements (e.g., a primary mirror and a secondary mirror). When such an optical device is moved from one location to another, as such usually happens for expeditionary, amateur astronomical or for tactical imaging systems, the relative position of the optical elements may change. Such a change results in misalignments which in turn result into a poorer quality image. The amount of degradation introduced in the image is directly related to the misalignment of the two main elements of the optical device.

The sensitivity of interferometers can extend down to parts per thousand of the wavelength of the light used. Unfortunately, most interferometers are intricate and complex to set tip and use. Accordingly, one of the difficulties is for a user to diagnose and correct problems quickly and without being an expert optician. Various tools have been developed in the past to overcome the above-identified problems. However, such tools rely on equipment that is not that straightforward and simple to use, or is expensive to manufacture.

Accordingly, a need exists to overcome the above-identified problems.

SUMMARY OF THE INVENTION

Aspects of the invention generally relate to systems and methods for evaluation of optical quality of an optical device using a point diffraction interferometer.

In one aspect, a system for evaluation of optical quality of an optical device includes a light source configured to generate light, the generated light being received by an optical device. An interferometric lens apparatus is removably mounted to the optical device to generate interference fringes. A camera device is configured to receive and display the interference fringes, and a computer is configured to analyze the interference fringes received from the camera device to determine aberrations of the optical device and generate a recommendation to correct the determined aberrations.

In another aspect, a system for characterizing an optical device for quality includes an interferometric lens apparatus configured to be removably mounted to an optical device. The interferometric lens apparatus is configured to generate an interferogram. The system further includes a processing device configured to analyze the interferogram to evaluate aberrations of the optical device and propose a solution to correct the aberrations.

In yet another aspect, an apparatus for evaluation of optical quality of an optical device includes a first lens, a point diffraction interferometer (PDI) formed by depositing a material as coating onto a surface of the first lens, and a second lens is located at a predetermined distance from the first lens and the PDI. The PDI is sandwiched between the first lens and the second lens and is configured to generate the interferogram. The first lens, the PDI, and the second lens are formed as a portable integrated unit.

In a further aspect, a method for determining optical quality of an optical device includes removably mounting an interferometric lens apparatus to an optical device. The interferometric lens apparatus includes a first lens, a point diffraction interferometer (PDI), and a second lens. The method includes coating a material onto a surface of the first lens to form the PDI. The method also includes generating an interferogram using the PDI, and evaluating the interferogram to determine the optical quality of the optical device. The evaluation includes at least one step of evaluating the interferogram in an alignment mode or an analysis mode. The analysis mode includes decomposing the interferogram using Zernike polynomials or other mathematical representation of the interferogram.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
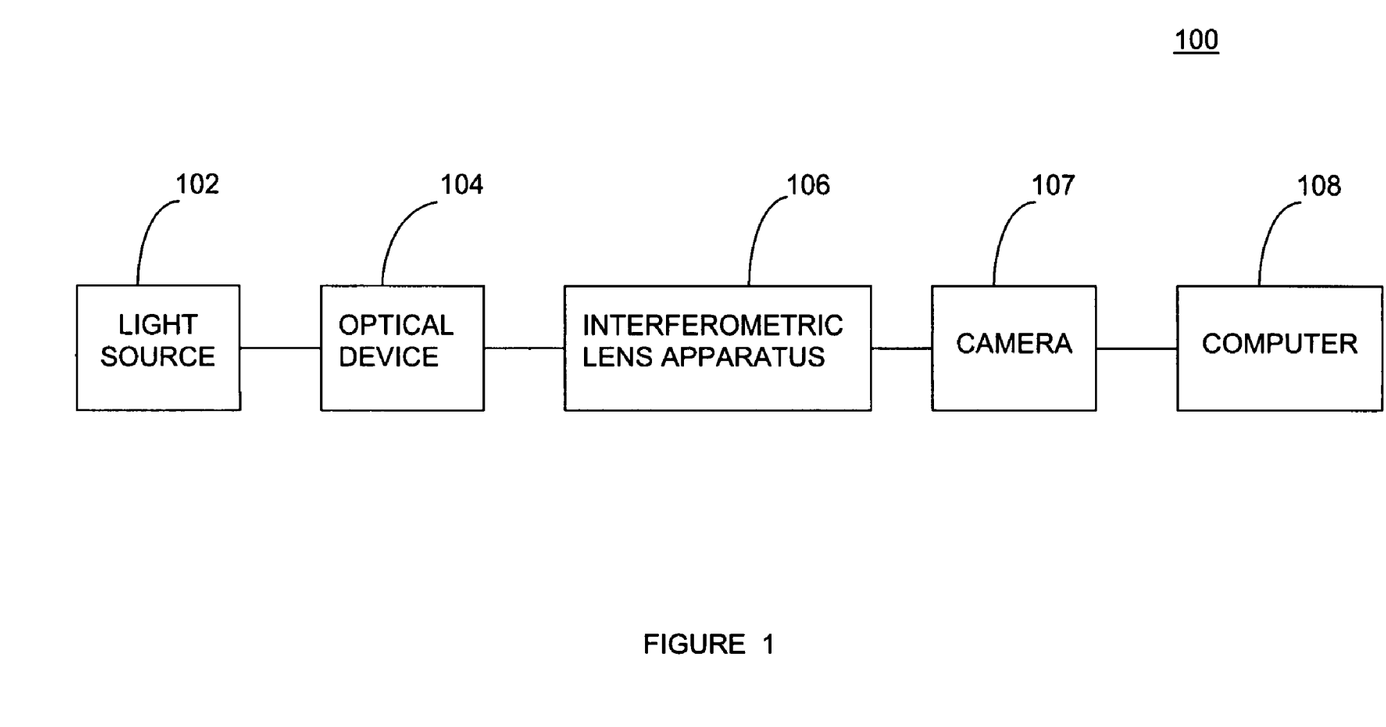
FIG. 1 is a high-level schematic of an interferometric lens system.

FIG. 1 is a high-level schematic of an interferometric lens system 100 for evaluation of optical quality of an optical device. The interferometric lens system 100 includes a light source 102, an optical device (e.g., telescope) 104, an interferometric lens apparatus 106, a camera 107, and a computer 108.

The light source 102 generates light for producing interference fringes. The light source 102 can be an artificial source of light such as, for example, a laser source, or it can be a natural source (e.g., star) of light.

The optical device 104 is a device that is under consideration to be tested for its optical quality. The device 104 can be, for example, a telescope or any other imaging system including naturally occurring ones (e.g. liquid or an atmosphere medium).

The interferometric lens apparatus 106 is a camera lens apparatus that is used to generate an interferogram which, when analyzed, provides a determination of the optical quality of the optical device 104. The IL apparatus 106 uses a point diffraction interferometer (PDI) to generate the interferogram. The IL apparatus 106 is typically located close to the focal plane of the optical device 104, i.e., the device being tested. The IL apparatus 106 can be used with a focused or collimated beam provided that an optic is used to either match the f-ratio of the device 104 or otherwise bring the light to focus on the PDI. Further details of the IL apparatus 106 and the PDI are described with respect to FIG. 2A and FIG. 2B.

The camera 107 is configured to receive and display the interference fringes produced by the IL apparatus 106. The output from the camera 107 can be fed to the computer 108 for purposes of alignment or further analysis of the interference fringes to evaluate the quality of the optical device 104.

The computer 108 is configured to receive information (e.g., information related to the interference fringes) from the IL apparatus 106, via the camera 107, in order to enable a user to perform alignment of the optical device 104 (e.g., telescope) by using the interference fringes produced by the IL apparatus 106 and displayed on the camera 107. In an alignment mode, interference fringes from the IL apparatus 106 are received by the computer 108. Based on the information known a priori, shapes of the interference fringes are observed. For example, if the interference fringes generated by the IL apparatus 106 are observed to be in the shape of an "S", such would indicate that the two main elements of the optical device 104 are misaligned. Likewise, for example, if the interference fringes are observed to be in the shape of an "X," such may indicate an astigmatism problem associated with the optical device 104. Such information can be helpful to a user of the optical device 104 in order to rectify the focus or astigmatism problems associated the optical device 104 without requiring the assistance of an expert optician to diagnose the optical device 104. The computer 108 is configured to receive information related to the interference fringes from the IL apparatus 106 and generate a course of action to a user to rectify the alignment problems associated with the optical device 104.

In the event the user is unable to match the generated interference fringes to a known shape, then further analysis of the interference fringes is performed. The computer 108 can be configured to decompose (e.g., using Zernike Polynomials) the interference fringes in order to match the decomposed information with a reference. It will be appreciated that Zernike decomposition is one tool and that other mathematical approaches are possible. Information received from the IL apparatus 106 is used for further analysis of the interference fringes produced by the IL apparatus 106. Such further analysis may be performed if the interference fringes produced by the IL apparatus 106 are not matched to known shapes of interference fringes that are stored in a storage device 406 (FIG. 4) of the computer 108. Further analysis of the interference fringes is performed by decomposing and reducing the interference fringes to a mathematical analysis of, for example, the coefficients of Zernike Polynomials in order to evaluate the quality of the interference fringes. Such determination of the quality of interference fringes is used to determine the defects present in the optical device 104. By using the information obtained from the interference fringes, the defects observed in the optical device 104 can be corrected.

Figure 2A:
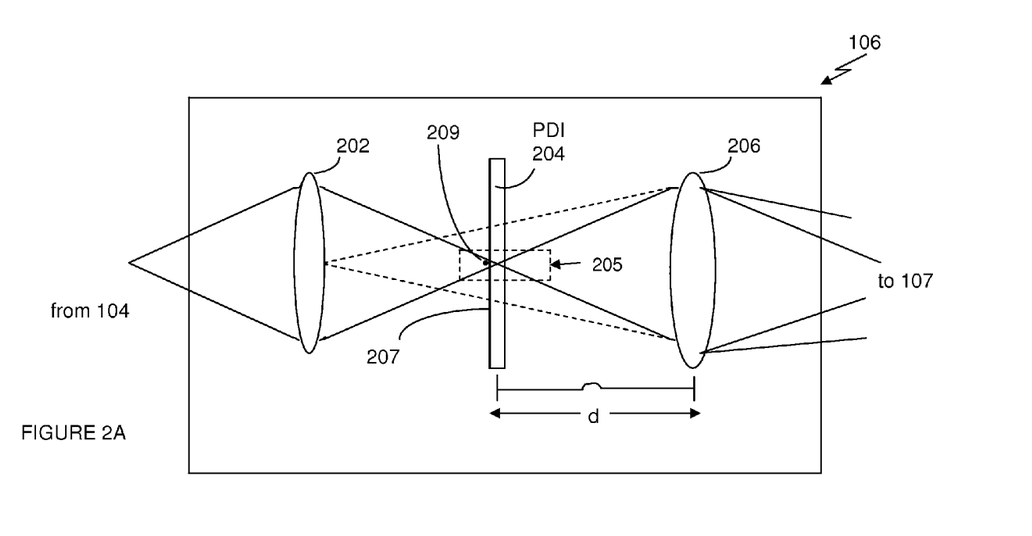
FIG. 2A is a schematic of an interferometric lens (IL) apparatus shown in FIG. 1.
Figure 2B:
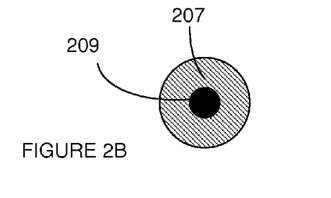
FIG. 2B is a schematic of an opaque obstruction 209 on a partially transmitting coating 207, both affixed to the PDI 204 shown in FIG. 2A.

FIG. 2A is a schematic of an interferometric lens (IL) apparatus 106. The IL apparatus 106 includes a first lens 202, a point diffraction interferometer (PDI) 204 having a reference wave generator 205 section (e.g., a pinhole in a partially transmitting coating, such as the partially transmitting coating 207) or an opaque obstruction 209)), and a second lens 206. In one exemplary embodiment, the IL apparatus 106 is a two-beam interferometer in which a reference beam is generated by diffraction from the wave generator 205 section in a coating (such as the partially transmitting coating 207) of PDI 204. The PDI 204 is constructed by depositing a coating (such as the partially transmitting coating 207 having a small transmitting circular region, in or on the partially transmitting coating 207), forming the obstruction 209 (see FIG. 2A and FIG. 2B) onto a surface of the PDI 204 held in a two axes mount so that it can be adjusted in position within the focal plane. The first lens 202 takes a collimated or reimaged beam and focuses it onto the PDI 204. The second lens 206 serves to reimage the interferogram onto the camera 107. The output from the camera 107 can be received by the computer 108.

The PDI 204 is positioned so that it is coincident with a portion of the aberrated point-spread function of the first lens 202. The light that is transmitted through the reference wave generator 205 section diffracts out to become the reference wave. In the limit of a point, the reference becomes a perfect spherical wave. For ease of illustration, FIG. 2A shows PDI 204 as being spaced from the first lens 202. The second lens 206 is spaced from the combination of the first lens 202 and the PDI 204 by a predetermined distance "d", where, referring to FIG. 2A and FIG. 2C, the second lens 206 is spaced using a plurality of spacers such as a spacer 222A, a spacer 222B, and a spacer 222C. The distance "d" between the second lens 206 and the combination of the first lens 202 and the PDI 204 is fixed for a particular IL apparatus 106. It will be appreciated that other IL apparatuses, each having a different predetermined distance "d" are possible. Such other IL apparatuses may be selectively chosen as needed to evaluate the optical quality of other optical devices.

The first lens 202, and the PDI 204, which is formed as a coating on a surface of the PDI 204, and the second lens 206 are formed as an integral unit identified as PDI apparatus 106. The PDI apparatus 106 can be installed in a mounting apparatus that resembles a standard eye-piece mounting, where, referring to FIG. 2C, the mounting apparatus includes a removable mounting device 220A and a removable mounting device 220B fastened together. Such a design allows for easy mounting of the PDI apparatus 106 to an optical device for alignment of the optical device such as, for example, optical device 104 (e.g., a telescope).

Figure 2C:
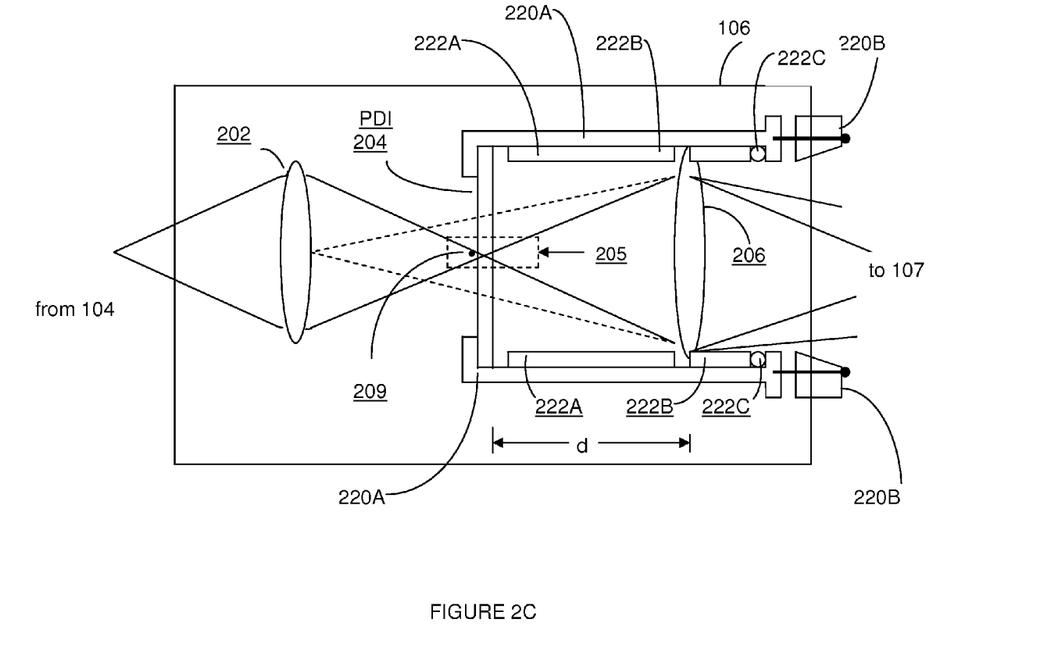
FIG. 2C is a schematic of a removable mount device/apparatus holding the interferometric lens apparatus illustrated in FIG. 2A (FIG. 2C illustrates an embodiment of the PDI 204 absent the partially transmitting coating 207.
Figure 3:
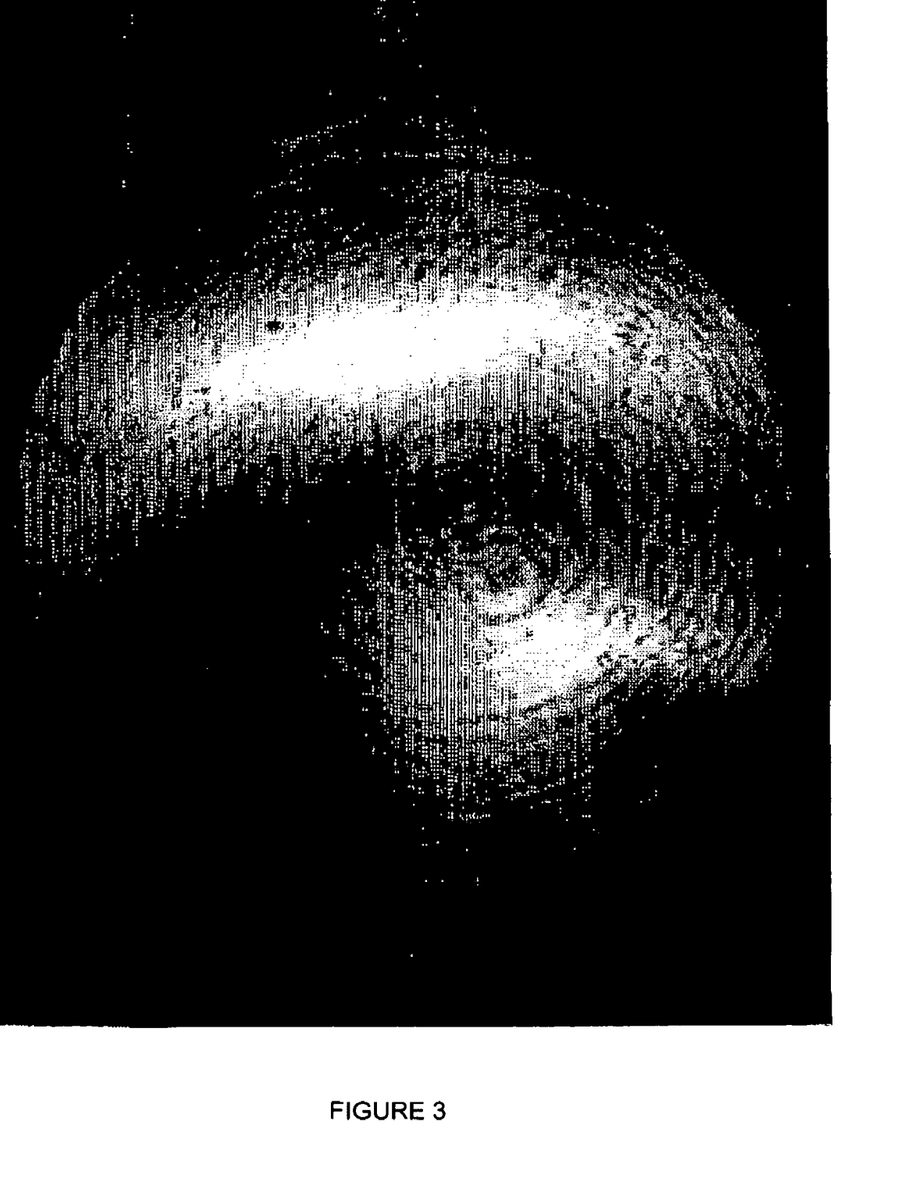
FIG. 3 shows a sample interferogram generated by the IL apparatus of FIG. 2A.

Light surrounding the reference wave generator 205 section is attenuated but otherwise transmitted unaffected through the partially transmitting coating 207 of the PDI 204. The function of the partially transmitting coating 207 can be to match amplitudes of the transmitted wave with the reference wave so that the contrast of the resulting interference fringes can be high. The reference wave amplitude is based on the amount of light from the point spread function that falls on the reference wave generator 205 section, which is based on aberrations of the lens and the part of the point spread function that is coincident with the reference wave generator 205 section. In one embodiment, the lens 206 can be located between one and two focal lengths of the lens 206 from the combination of the lens 202 and the PDI 204 and spaced with one of the spacer 222A and the spacer 222B and the spacer 222C, where the spacer 222A and the spacer 222B are composed of a low thermal expansion material so that it can be fixed in position, and spacer 222C can be composed of any material. Such a design can reimage the interferogram onto the camera 107 with the desired size to match the camera 107. Such a design also can provide a single degree of freedom for focus and two degrees of freedom to reposition a spot of the PDI 204 to adjust contrast. The interferogram can be displayed on the camera 107 and is available for analysis. A sample interferogram is shown in FIG. 3 which discloses aberrated fringes from the exemplary IL apparatus 106.

Figure 4:
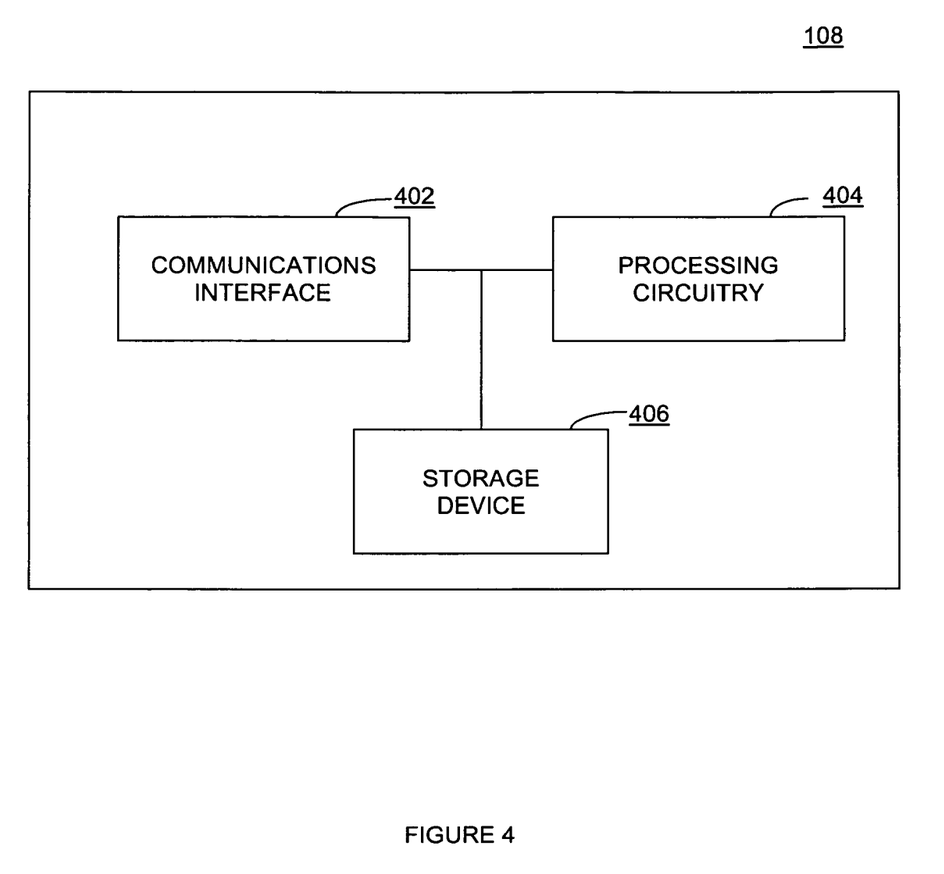
FIG. 4 shows details of an exemplary computer configured to analyze interference fringes produced by the IL apparatus as shown in FIG. 2A.

FIG. 4 shows details of an exemplary computer 108 configured for analyzing interference fringes generated by the IL apparatus 106. The illustrated computer 108 includes a communications interface 402, processing circuitry 404, and a storage device 406.

Communications interface 402 is configured to communicate electronic data externally of the computer 108, for example, with respect to the camera 107, and other external devices. Interface 402 may comprise a parallel port, USB port, EIO slot, network interface card, IEEE 1394 connector, and/or other appropriate configuration capable of communicating electronic data.

Processing circuitry 404 is configured to process data received from the camera 107 to evaluate the quality of the optical device 104. In one embodiment, processing circuitry 404 may comprise circuitry configured to execute provided programming. In one example, processing circuitry 404 may be configured to include executable applications (e.g., software for evaluating the quality of an optical device). Exemplary software applications include software that decomposes interference fringes received from the IL apparatus 106, into coefficients of Zernike Polynomials. For example, processing circuitry 404 may be implemented as a microprocessor or other structure configured to execute executable applications of programming including, for example, software and/or firmware instructions. Other exemplary embodiments of processing circuitry 404 include hardware logic, PGA, FPGA, ASIC, and/or other structures. These examples of processing circuitry 404 are for illustration and other configurations are possible for implementing operations discussed herein.

Storage device 406 is configured to store electronic data, a database with file systems having one or more electronic files, programming such as executable instructions (e.g., software and/or firmware), and/or other digital information and may include processor-usable media. Processor-usable media includes any article of manufacture that can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

As illustrated in the depicted example, storage device 406 is configured to store file systems having one or more electronic files with information related to various interference fringe patterns. The processing circuitry 404 is configured to compare the interference fringes generated by the IL apparatus 106 with information stored in the storage device 406 in order to evaluate the quality of the optical device 104.

Figure 5:
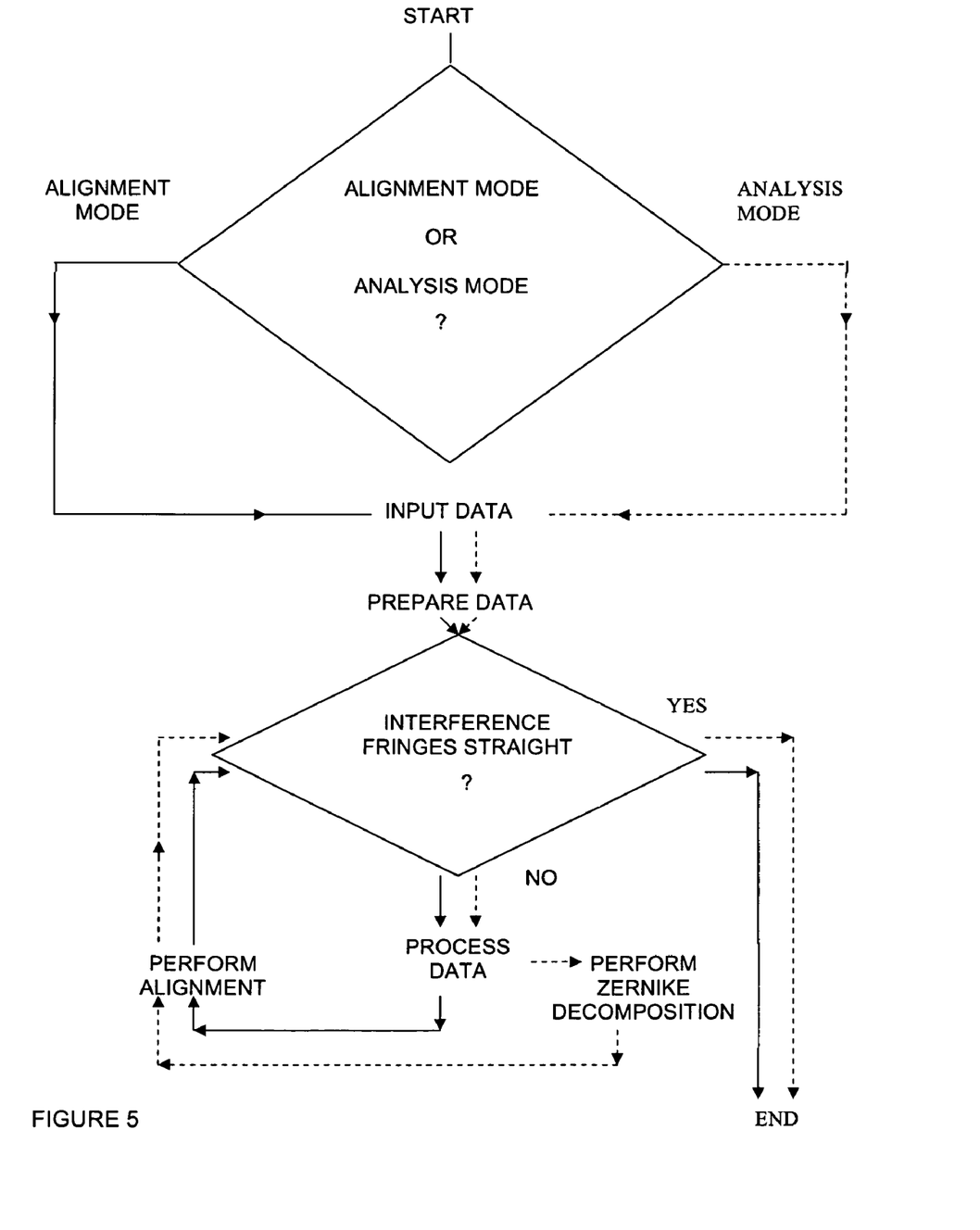
FIG. 5 shows an exemplary methodology for evaluating the optical quality of the optical device shown in FIG. 1.

FIG. 5 shows an exemplary methodology for evaluating the quality of an optical device (e.g., optical device 104). After the interference fringes are generated by the IL apparatus 106 and received by the computer 108, the analysis software stored in the computer 108 can be run in two modes—alignment mode, diagnostic or analysis mode. In the alignment mode, a user would prefer to align the optical device 104, and the live feed from the camera 107 provides input to the software stored in the computer 108. The software is configured to analyze the interference fringes generated by the IL apparatus 106 and suggest a course of action to the user, in an iterative fashion, with a perfect alignment being achieved as a final result.

In the analysis mode, the user is interested in the overall analysis of the optical device 104. The input in this case is the same as the input in the alignment mode, but the output is a graphical analysis of the aberrations as a wavefront map or the Zernike expansion of such map. The Zernike polynomials are a customary set of polynomials used in optics to expand the aberration function. Zemax and Oslo are exemplary software packages that include Zernike polynomials.

At a step 502, it is determined whether the analysis software should be run in the alignment mode or the analysis mode. The process then moves to step 504.

At a step 504, data is input to the computer 108. The data represents interference fringes generated by the IL apparatus 106. The data can be received from the camera 107.

At a step 506, the received data is prepared by the computer for use by the analysis software. The process then moves to step 508.

At a step 508, an inquiry is made to find out if the received interference fringes are straight. If the received interference fringes are straight, the process stops. Such straight interference fringes indicate that the optical device under test (e.g., optical device 104) is perfectly aligned and therefore needs no correction. If the received interference fringes are not straight, the process moves to step 510.

At a step 510, the received interference fringes are further processed. Such processing includes comparing the received interference fringes with interference fringe information stored in the storage device 408. Such processing produces a result indicating that the optical device 104 includes optical errors. The process the moves to step 512.

At a step 512, the user is prompted to take corrective action to perform alignment of the optical device 104. The process then loops back to step 508.

Process steps 502 through 510 as described above are common for the analysis mode. In the analysis mode, after step 510, step 514 is performed.

At a step 514, the processor 404 performs mathematical (e.g. Zernike) decomposition to decompose the aberration of the received interference fringes by reducing the interference fringes to the coefficients of Zernike polynomials. The Zernike decomposition is performed to further analyze the aberration associated with the optical device under test (e.g., optical device 104) and propose a solution to rectify the identified aberration. It will be appreciated that the combination of the above-identified alignment and analysis modes are possible.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A system for evaluation of optical quality of an optical device, said system comprising:
   a light source configured to provide light to the optical device; a computer;
   a camera, that receives and displays interference fringes; and
   an interferometric lens apparatus comprising a first lens, a point diffraction interferometer (PDI) and a second lens,
   wherein said interferometric lens apparatus is configured to be removably mounted to the optical device, and is configured to generate interference fringes,
   wherein said PDI comprises a material coated onto a surface of said PDI,
   wherein said material coated onto the surface of said PDI is a small circular region formed as an opaque spot coating which forms a partial obstruction to light provided to the optical device, causing light provided from the optical device to surround said partial obstruction, which causes a reference wave to form, by diffraction at an edge of said opaque spot coating, wherein the reference wave and light surrounding said partial obstruction are transmitted to the camera, wherein said opaque spot coating is a partially transmitting opaque coating, wherein said first lens, said PDI, and said second lens are formed as a single integrated unit that is removably mounted onto the optical device, wherein the single integrated unit that is removably mounted includes a plurality of spacers spacing said first lens, said PDI, and said second lens at a predetermined distance, wherein said partial obstruction and the plurality of spacers are composed of a low thermal expansion material, and wherein said low thermal expansion material includes one or more of aluminum, steel and glass.

2. The system of claim 1,
   wherein said computer is configured to analyze interference fringes to determine aberrations of the optical device and generate a recommendation to a user to correct determined aberrations of the optical device.

3. The system of claim 2, wherein said computer is configured to perform Zernike decomposition of interference fringes to evaluate optical quality of the optical device.

4. The system of claim 1, wherein said PDI is disposed between said first lens and said second lens.

5. The system of claim 1, wherein said PDI is one of a glass window and a crystal window in the shape of a disk, upon which one or more of the material and the partial obstruction are coated one of onto and into the surface of said disk.

6. A system for evaluation of an optical quality of an optical device, said system comprising:
   a light source, wherein the light source is an optical instrument including one or more of a laser and a telescope;
   a camera, wherein the camera records an interferogram;
   a processing device configured to analyze the interferogram from the camera to evaluate aberrations of the optical device and propose a solution to correct aberrations of the optical device; and
   an interferometric lens apparatus comprising a first lens, a point diffraction interferometer (PDI) and a second lens, said interferometric lens apparatus being configured to be removably mounted to the optical device, and being configured to generate an interferogram,
   wherein said PDI comprises a material coated onto a surface of said PDI,
   wherein said material coated onto the surface of said PDI is a small circular region formed as an opaque spot coating which forms an obstruction to light provided to the optical device, causing light provided to the optical device to surround said obstruction, which causes a reference wave to form, by diffraction at an edge of said opaque spot coating, wherein the reference wave and light surrounding said partial obstruction are transmitted to the camera, wherein said opaque spot coating is a totally opaque coating, wherein said first lens, said PDI, and said second lens are formed as a single integrated unit that is removably mounted to the optical device, wherein the single integrated unit that is removably mounted to the optical device includes a plurality of spacers spacing said first lens, said PDI and said second lens at a predetermined distance apart from each other, wherein the plurality of spacers are composed of a low thermal expansion material, and wherein said low thermal expansion material includes one or more of aluminum, steel and glass.

7. The system of claim 6, wherein the optical device is located between the light source and said interferometric lens apparatus.

8. The system of claim 6,
   wherein said PDI is disposed between said first lens and said second lens, wherein said PDI is held in a two axes mount and adjustable within a focal plane.

9. The system of claim 6, wherein said processing device is configured to perform Zernike decomposition of the interferogram to evaluate the optical quality of the optical device.

10. An apparatus for evaluation of an optical quality of an optical device, said apparatus comprising:
    a first lens;
    a point diffraction interferometer (PDI) formed by depositing a material as coating on a surface of said PDI; and
    a second lens located at a predetermined distance from said PDI,
    wherein said PDI is disposed between said first lens and said second lens and is operable to generate an interferogram, and wherein the interferogram is generated when said apparatus is communicatively coupled to a light source and a camera, and
    wherein said first lens, said PDI, and said second lens are formed as
    a portable integrated unit that is removably mounted to the optical device,
    wherein said PDI comprises a material coated onto a surface of said PDI,
    wherein said material coated onto the surface of said PDI is a small circular region formed as an opaque spot coating which forms a partial obstruction to light provided from the optical device, causing light provided from the optical device to surround said partial obstruction, which causes a reference wave to form, by diffraction at an edge of said opaque spot coating, wherein the reference wave and light surrounding said partial obstruction are transmitted to the camera, wherein said opaque spot coating is a partially transmitting opaque coating, wherein said portable integrated unit that is removably mounted to the optical device includes a plurality of spacers spacing said first lens, said PDI, and said second lens at a predetermined distance from each other, wherein said partial obstruction and the plurality of spacers are composed of a low thermal expansion material, and wherein said low thermal expansion material includes one or more of aluminum, steel and glass.

11. The apparatus of claim 10, further comprising a processing device configured to perform Zernike decomposition of the interferogram to evaluate the optical quality of the optical device.

12. A method for determining optical quality of an optical device, said method comprising:

providing light to the optical device by a light source;

removably mounting an interferometric lens apparatus to the optical device the interferometric lens apparatus including a first lens, a point diffraction interferometer (PDI), and a second lens, wherein the interferometric lens apparatus and the optical device are communicatively coupled to the light source and the camera, wherein said PDI comprises a material coated onto a surface of said PDI, wherein said material is a small circular region forming an opaque spot coating, causing a partial obstruction to light provided from the optical device, causing light provided from the optical device to surround said partial obstruction, forming a reference wave, by diffraction at an edge of said opaque spot coating, wherein the reference wave and light surrounding said partial obstruction are transmitted to a camera, wherein said opaque coating is one of a partially transmitting opaque coating and a totally opaque coating, wherein said PDI is disposed between the first and second lenses, wherein said PDI is held in a two axes mount and adjustable within a focal plane, and wherein the first lens, said PDI, and the second lens are formed as an integrated unit that is removably mounted onto the optical device, wherein the integrated unit that is removably mounted onto the optical device includes a plurality of spacers spacing said first lens, said PDI, and said second lens at a predetermined distance, and wherein the plurality of spacers and said partial obstruction are composed of a low thermal expansion material;

generating an interferogram using said PDI, the light source and the camera; and evaluating the interferogram in an evaluating operation using a processing device to determine optical quality of the optical device.

13. The method of claim 12, wherein evaluating includes one or more of evaluating the interferogram in one of an alignment mode and an analysis mode, and wherein the analysis mode includes decomposing the interferogram using Zernike polynomials.

14. The method of claim 12, further comprising generating, by the processing device, a recommendation to a user to correct aberrations determined by said evaluating operation.

15. The method of claim 12, wherein said low thermal expansion material includes one or more of aluminum, steel and glass.

* * * * *